United States Patent [19]

Brown

[11] 4,307,866
[45] Dec. 29, 1981

[54] INJECTION MOLD WITH FLOATING STRIPPER RING

[75] Inventor: Paul Brown, Orangeville, Canada

[73] Assignee: Husky Injection Molding Systems Ltd., Bolton, Canada

[21] Appl. No.: 183,930

[22] Filed: Sep. 3, 1980

[51] Int. Cl.³ .............................................. B29F 1/14
[52] U.S. Cl. ..................................... 249/63; 425/556; 425/577; 249/67
[58] Field of Search .................. 249/63, 67; 425/577, 425/556

[56] References Cited

U.S. PATENT DOCUMENTS 3,660,002  5/1972  Morroni ......................... 425/556 X
4,125,246 11/1978  Von Holdt ..................... 425/556 X Primary Examiner—J. Howard Flint, Jr.
Attorney, Agent, or Firm—Karl F. Ross

[57] ABSTRACT

An injection mold with a female mold portion and a male mold portion has a locking ring consisting of two releasably interconnected annular members with respective tapering inner centering surfaces which, in a mold-closed position, embrace respective outer centering surfaces of the two mold portions for holding them precisely aligned for molding a thin-walled cup between a tapered core of the male portion and a cavity wall of the female portion. The core is surrounded by a stripper ring which is received with a certain amount of axial play between internal shoulders of the locking-ring members for joint entrainment by a stripper plate when the mold is opened.

3 Claims, 3 Drawing Figures

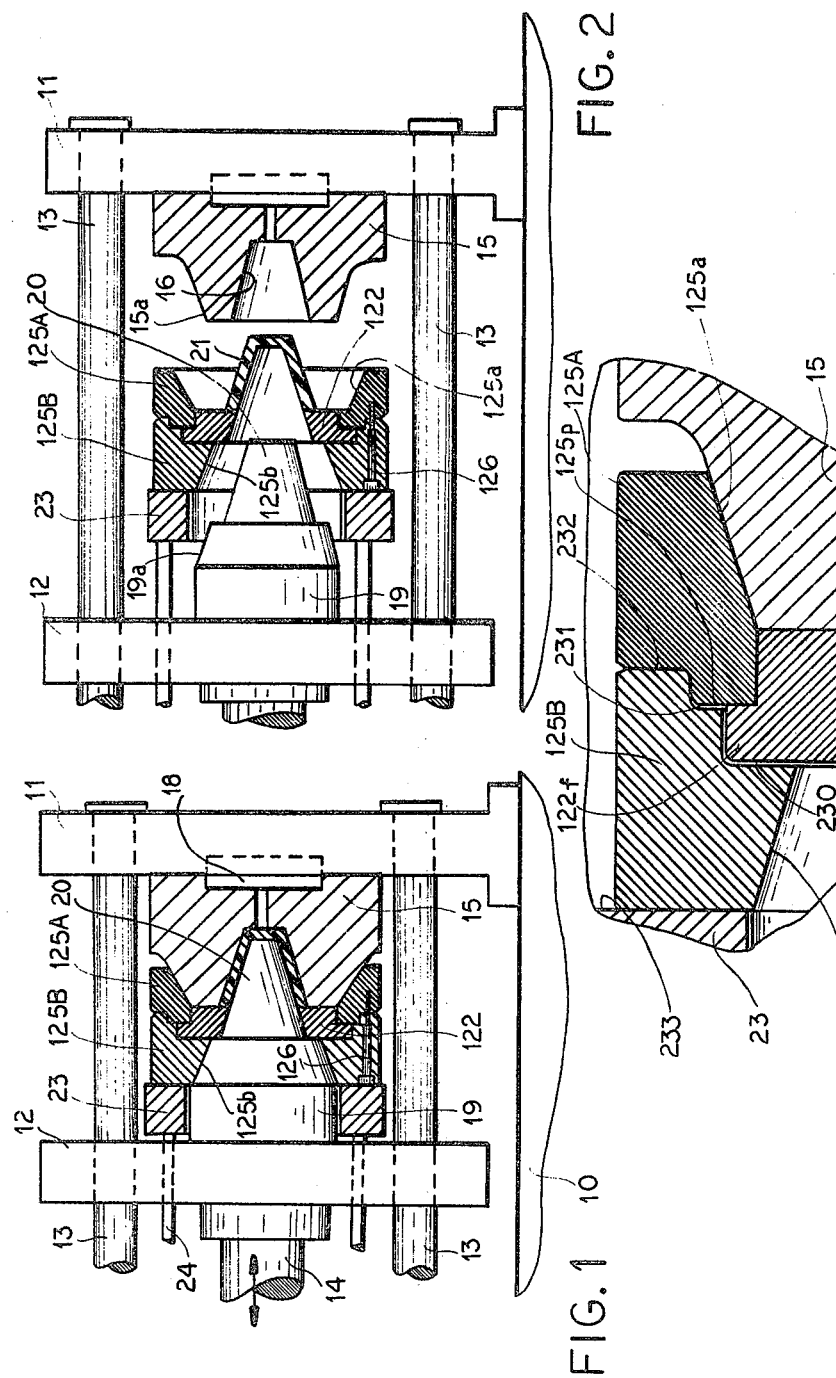

INJECTION MOLD WITH FLOATING STRIPPER RING

FIELD OF THE INVENTION

My present invention relates to a mold for an injection-molding machine having male and female mold parts carried on two relatively movable platens and interconnected by tie bars, a stripper ring being used for dislodging a molded article from a core forming part of the male mold portion, as disclosed and claimed in my commonly assigned prior U.S. Pat. No. 4,179,254.

BACKGROUND OF THE INVENTION

Especially for the molding of thin-walled cups and similar articles, it is essential to insure an exact alignment of the core with a coacting cavity in the female mold portion. If the core is lightly tapered, the molded article adheres to it when the mold is opened and will therefore have to be stripped off by a ring closely hugging that core. Such a stripper ring, carried on a stripper plate extending radially beyond the mold, can also be used as a means for relatively centering the core and the cavity; injection molds have, in fact, been so constructed in the past.

In order to insure accurate centering of a removable stripper ring with reference to the associated core, the mold assembly of my above-identified prior patent includes a locking ring having tapering first and second inner centering surfaces engageable with respective outer centering surfaces engageable with respective outer centering surfaces of the corresponding mold portions, the locking ring being secured to a stripper plate which is slidably supported between the platens on their tie bars (either directly or through the intermediary of one of these platens) for movement parallel to the tie bars in a mold-open position. The stripper ring is seated in the locking ring between the centering surfaces thereof so as to be entrainable by the stripper plate together with the locking ring.

As long as the locking ring and the coacting mold portions are precisely machined to given specifications, that assembly operates entirely satisfactorily. Difficulties may arise, however, in the case of dimensional deviations which may cause either or both of these mold portions to abut against the stripper ring before becoming firmly seated in the corresponding centering surface of the locking ring or, conversely, may leave clearances between the stripper ring and the end faces of the mold portions. With such an imperfect fit, coaxiality of mold core and cavity would be lost or plastic molding material could flash into the space between the cavity and the stripper ring, both these occurrences resulting in faulty workpieces.

While the stripper ring of excessive axial height could be readily machined to proper thickness for accurate centering, a stripper ring of insufficient thickness would require machining of one of the tapering inner surfaces of the locking ring which is much more difficult to accomplish. Moreover, with the usual vertex angle of these tapering surfaces, a given increase in their radius results in about a fourfold reduction in the axial height of the mold stack.

This problem is intensified in a multicavity mold where the stack height must be the same for all the cavities and where, therefore, an improper fit at one cavity—due to manufacturing tolerances or wear—would require all tapers to be reground and all axial lengths to be trued to insure accurate centering and flash-free performance.

OBJECTS OF THE INVENTION

An object of my present invention, therefore, is to provide an improved mold assembly of the type disclosed in my prior patent which simplifies the problem of precisely interfitting the several stack-forming components, namely the mold portions, the locking ring and the stripper ring.

Another object is to provide an assembly of this type which eliminates the need for retaining screws, as disclosed in the prior patent, designed to hold the stripper ring in position.

SUMMARY OF THE INVENTION

Pursuant to my present improvement, the locking ring comprises two releasably interconnected annular members respectively provided with the aforementioned first and second inner centering surfaces, one of these members surrounding the male mold portion while being mounted on the stripper plate, the other member holding the stripper ring in position between the two members with a certain amount of axial play when the mold is open. Upon closure of the mold, the stripper ring is firmly clamped between the two mold portions which in turn are centered in the two annular members of the locking ring.

If the stripper ring happens to be so thick as to interfere with proper centering, its regrinding will have no effect upon the stack height of the closed mold. If, on the other hand, that ring is too thin, only an end face of one of the locking-ring members but no tapering surface will require regrinding. Since only flat surfaces will have to be machined in any event, even a multicavity mold can be trued this way in a relatively simple manner.

In accordance with a more particular feature of my present improvement, the two locking-ring members have stepped internal profiles which contact each other only in one transverse plane and are axially separated elsewhere by one or more annular gaps so that only a single step of limited radial width will have to be machined if the stack height is to be reduced for the purpose discussed above.

BRIEF DESCRIPTION OF THE DRAWING

The above and other features of my invention will now be described in detail with reference to the accompanying drawing in which:

FIGS. 1 and 2 are axial sectional views substantially corresponding to FIGS. 3 and 4 of my prior patent but showing the present improvement; and FIG. 3 is a fragmentary sectional detail view drawn to a larger scale.

SPECIFIC DESCRIPTION

The injection-molding machine partially shown in the drawing comprises a machine bed 10, a stationary and a movable platen 11 and 12 interconnected by tie bars 13, a ram 14 for reciprocating the platen 12, a female mold portion 15 carried on platen 11 with a cavity 16 to which liquefied plastic material is periodically fed from an injection unit 18, a male mold portion 19 on platen 12 with a frustoconical core 20 adapted to enter the cavity 16 to form a cup-shaped workpiece 21, a stripper ring 122 fitting around the core 20, and a stripper plate 23 indirectly supported on tie bars 13 via actuating rods 24 which traverse the platen 12, all as shown and described in my prior U.S. Pat. No. 4,179,254.

Stripper ring 122 is seated in a locking ring which, in contradistinction to the disclosure of that prior patent, is split into two interfitting annular members 125A and 125B that have stepped internal profiles and are releasably interconnected by several axially extending bolts 126 (only one shown). Ring members 125A and 125B are respectively formed with tapering inner centering surfaces 125a and 125b which, like the correspondingly designated surfaces in the locking ring of the prior patent, matingly fit around complementary outer centering surfaces 15a, 19a of mold portions 15 and 19, respectively, when the mold is in its closed position illustrated in FIG. 1. Stripper ring 122 is bracketed by these ring members and is held between them with limited axial play as more particularly illustrated in FIG. 3.

For the sake of clarity, parts of stripper plate 23, ring members 125A and 125B, stripper ring 122 and mold portion 15 have been shown in FIG. 3 in a position corresponding to that of FIG. 1 but with mold portion 19 omitted. Member 125B is fastened by nonillustrated mounting means to a surface 233 of plate 23. The stepped profiles of members 125A and 125B form a pair of annular shoulders 125p and 125q whose axial spacing exceeds the axial height of an intervening peripheral flange 122f formed on ring 122. The stripper ring, therefore, is not firmly clamped between the two locking-ring members since a gap as shown at 230 will always be present between at least one of the shoulders 125p, 125q and the adjoining land or lands of flange 122f. In operation, however, ring 122 should be immobilized between confronting faces of mold portions 15 and 19 in the closure position of FIG. 1.

If the axial height of ring 122 is excessive so that one of the mold portions does not properly contact its centering surface 125a or 125b, this can be readily remedied by grinding one of the surfaces of that ring. If, on the other hand, the ring is too thin so as not to be tightly clamped between mold portions 15 and 19 seated against these centering surfaces, the axial separation of surfaces 125a and 125b will have to be correspondingly reduced. Since the profiles of ring members 125A and 125B are so designed that none but their outermost annular steps meet at a contact surface 232 which lies in a transverse radial plane, only one of these two steps will have to be reground for that purpose as long as the extent of the required height reduction does not exceed the width of an annular gap 231 present between profile step 125p of member 125A and a confronting step of member 125B. To allow for such adjustment, the initial width of gap 231 is preferably not less than the axial play represented by the gap 230 in FIG. 3.

In a multicavity mold, female and male mold portions may have a plurality of centering surfaces 15a and 19a coaxial with respective cavities 16 and cores 20 alignable by individual locking rings 125A, 125B. If, initially, one or more stripper rings are found to be too thin, all the locking rings may have to be reground at their contact surfaces 232 with maintenance of a uniform stack height; any stripper ring thereafter appearing too thick can then be machined with no further changes in stack height.

I claim:

1. In an injection-molding machine provided with two relatively movable platens interconnected by tie bars, a male mold portion on one of said platens, a female mold portion on the other of said platens having a cavity enterable in a mold-closed position by a core projecting from said male mold portion, a stripper ring surrounding said core for dislodging a molded article therefrom in a mold-open position, a stripper plate supported at least indirectly on said tie bars between said platens for movement parallel to said tie bars in said mold-open position, and a locking ring provided with tapering first and second inner centering surfaces engaging respective outer centering surfaces of said mold portions in said mold-closed position for maintaining said mold portions in mutual alignment, said stripper ring being coaxially seated in said locking ring between said inner centering surfaces thereof, said locking ring being mounted on said stripper plate for entrainment thereby in said mold-open position, the improvement wherein said locking ring comprises two releasably interconnected annular members respectively provided with said first and second inner centering surfaces, one of said members surrounding said male mold portion while being mounted on said stripper plate, the other of said members holding said stripper ring with limited axial play in position between said members while enabling said stripper ring to be clamped between said mold portions in said mold-closed position.

2. The machine defined in claim 1 wherein said members have confronting annular shoulders adjoining respective lands of a peripheral flange of said stripper ring, said shoulders being separated from each other by an axial distance greater than that separating said lands.

3. The machine defined in claim 2 wherein said members have stepped internal profiles forming said shoulders, said profiles contacting each other only in one transverse plane and being axially separated elsewhere by at least one annular gap of a depth at least equaling said axial play.

* * * * *